(12) United States Patent
Suarez

(10) Patent No.: US 7,780,851 B2
(45) Date of Patent: Aug. 24, 2010

(54) OIL FILTER INSPECTION DEVICE HAVING INTERCHANGEABLE ADAPTERS AND DRIVE PIN ASSEMBLY HAVING DETENTS

(76) Inventor: Antonio Suarez, 16 Bland St., Emerson, NJ (US) 07630

( * ) Notice: Subject to any disclaimer, the term of this patent is extended or adjusted under 35 U.S.C. 154(b) by 433 days.

(21) Appl. No.: 11/796,391

(22) Filed: Apr. 27, 2007

(65) Prior Publication Data

US 2008/0264839 A1    Oct. 30, 2008

(51) Int. Cl.
*B01D 35/00* (2006.01)

(52) U.S. Cl. .............. 210/542; 30/1; 30/358; 73/865.8; 73/866; 82/46; 82/113; 83/451; 83/520; 269/55; 269/58; 269/61

(58) Field of Classification Search .......... 30/1.5, 30/400, 401, 410, 415–419, 423, 1, 358; 123/196 A; 184/1.5; 210/232, 248, 435, 210/450, 541, 542; 82/92, 46, 47, 113; 73/865.8, 73/865.9, 866; 83/374, 451, 520; 269/55, 269/58, 61, 329

See application file for complete search history.

(56) References Cited

U.S. PATENT DOCUMENTS

| 2,555,931 | A | * | 6/1951 | Raab .......................... 30/401 |
| 4,702,007 | A | * | 10/1987 | Nomura et al. ............... 30/423 |
| 5,133,234 | A | * | 7/1992 | Ehlert et al. .................... 82/92 |
| 5,791,310 | A | * | 8/1998 | Grigorian et al. ....... 123/196 A |
| 6,477,775 | B2 | * | 11/2002 | Scribner et al. ............... 30/1.5 |
| 6,581,498 | B2 | * | 6/2003 | Beyer ......................... 82/1.11 |

* cited by examiner

*Primary Examiner*—Joseph W Drodge
(74) *Attorney, Agent, or Firm*—Len Taylor Esq

(57) ABSTRACT

A lightweight portable motorized oil filter inspection device comprising a housing, a drive plate having a plurality of gear teeth, an oil filter size adapter mounting adaptable to receive at least one of a plurality of interchangeable oil filter size adapters, at least one drive pin assembly mounting for accepting at least one adjustable drive pin assembly having a plurality of detents, a cutting blade assembly and a means to rotate the drive plate. The drive pin assembly having a plurality of detents enables precise alignment of at least one drive pin with at least one of the oil flow apertures of an oil filter canister. The drive plate is directly driven by a motor drive gear having a plurality of compatible gear drive teeth, mounted on an electric motor shaft.

17 Claims, 5 Drawing Sheets

OIL FILTER INSPECTION DEVICE HAVING INTERCHANGEABLE ADAPTERS AND DRIVE PIN ASSEMBLY HAVING DETENTS

BACKGROUND OF THE INVENTION

1. Field of the Invention

The present invention generally relates to a portable motorized oil filter inspection device for disassembling an oil filter canister to allow for inspection of the oil filter and its component parts. More particularly a portable motorized oil filter inspection device that is lightweight and can be used at any field location such as a racetrack, a repair shop, an airport, is constructed such that it can be fitted with a plurality of size adapters that can accommodate any size oil filter canister. The oil filter canister is severed using an adjustable cutting blade assembly of the oil filter inspection device thereby allowing access to the oil filter element for easy inspection of the filter element, and its metallic and non-metallic trappings.

2. Discussion of Related Art

Filter media for lubricating oils used in motors has progressed significantly since its inception. Many oil filters are standardized, are produced by many different manufacturers, and are available for purchase in virtually every retail outlet equipped with automotive products. Additionally canister style disposable oil filters are used in a variety of other industries, such as the airline and farm machinery industry. When changing the oil in a motor it has become a standard practice, to also change the oil filter. Since oil filters are predominately standardized, this usually involves unscrewing the used oil filter from a position adjacent to the motor and replacing it with a new filter.

A standard oil filter comprises a housing that encloses a filter element constructed of a permeable material capable of separating solid materials from the oil. The housing generally is cylindrical in shape, usually having one end constructed of a relatively heavy material such as steel and another end of the cylindrical portion being constructed of a lighter alloy of steel. The end portion constructed of the heavier steel has a threaded aperture drilled through approximately the center thereof, this aperture being the means of attachment to the motor. Communication with the oil to be filtered is achieved by a series of oil flow apertures drilled into the heavier steel end portion surrounding the threaded aperture. A gasket material typically is affixed onto the heavier steel end portion near the outside circumference of the heavier steel end portion to prevent oil leakage when the oil filter is connected adjacent to a motor.

With the advent of increasing environmental awareness, oil filter cutters have been developed to cut open used oil filters for recycling the metals that comprise the filter housing. Once the housing has been removed, the filter element can then be disposed of by incineration or some other environmentally acceptable means.

Additionally oil filter canisters can be cut open to inspect any metallic and non-metallic trappings captured by the oil filter. By determining what metals are present within the trappings, an inspector can render a determination as to which internal engine component may be at or near failure, therefore requiring replacement of that deteriorated component. The advantage to determining which internal engine components may be deteriorated is that more severe mechanical problems to a motor that may arise from the continued use of a faulty or near faulty internal engine component can be avoided. Particularly, in the airline industry constant monitoring of internal engine components is a must to ensure the safe operation of an aircraft and the safety of the aircraft's crew and passengers.

At present most used oil filters are cut open in a machine shop using large bulky cutting machines. These oil filters are predominately cut open to recycle the materials that comprise the oil filter canister. However for inspection purposes having the ability to cut any size oil filter open at any field location would be convenient, save time, and advantageously render the inspection process more efficient.

Thus a need exists for an oil filter inspection device that is portable, compact, and motorized and that can be employed to cut open any size oil filter at any location necessary. A further need exists for an improved oil filter inspection device design that is portable and motorized having a rechargeable energy source. A further need exists for an oil filter inspection device that can efficiently and precisely rotate any size oil filter canister to be cut. Yet a further need exists for an improved oil filter inspection device that easily accommodates any size oil filter canister.

SUMMARY OF THE INVENTION

An object of the present invention is to provide an efficient solution to the problem of cutting open used oil filters at any location necessary including field locations.

Another object of the present invention is to provide a portable oil filter inspection device comprising a plurality of interchangeable adapters that can fit any size oil canister.

Another object of the present invention is to provide a portable oil filter inspection device comprising a precision adjustable drive pin assembly having detents that locks into position and is adaptable to fit a variety of oil filter sizes.

Another object of the present invention is to provide a portable oil filter inspection device that is gear driven providing smooth steady rotation of the oil filter being cut.

Another object of the invention is to provide a light-weight portable oil filter inspection device that is motorized being powered by a portable rechargeable energy source.

BRIEF DESCRIPTION OF THE DRAWINGS

Preferred embodiments of the present invention will be described below in more detail, with reference to the accompanying drawings.

DETAILED DESCRIPTION

According to a preferred embodiment of the present invention, a portable oil filter inspection device can be constructed of a lightweight metal such as aluminum and an aluminum alloy but other metals and alloys can be used. The lightweight portable oil filter inspection device is motorized and powered by a portable energy source such as a lithium battery pack but any portable energy source can also be used. Additionally the energy source does not have to be portable rather a standard electrical or non-standard energy outlet can also be used to power the oil filter inspection device. Moreover the oil filter inspection device can be constructed to be powered by a motor that operates using fuel such as gasoline or propane.

The oil filter inspection device comprises housing and a drive plate having gear teeth that is directly driven by a compatible motor drive gear mounted on an electric motor shaft. The drive plate comprises an oil filter size adapter mounting adaptable to receive at least one of a plurality of interchangeable oil filter size adapters. The at least one of a plurality of interchangeable oil filter size adapters comprise threads that can accommodate a variety of center aperture sizes of oil filter canisters whereby any size oil filter canister can be connected to the oil filter inspection device. During operation at least one of a plurality of interchangeable oil filter size adapters is selected to fit the oil filter canister to be inspected and is connected to the oil filter size adapter mounting of the drive plate by a connecting means such as screw threads. The oil filter canister is connected to the oil filter inspection device for inspection by connecting the oil filter canister to the at least one of a plurality of interchangeable oil filter size adapters connected to the drive plate. The drive plate further comprising at least one drive pin assembly mounting for accepting at least one adjustable drive pin assembly having detents thereby enabling precise alignment of at least one drive pin with at least one of the oil flow apertures of the oil filter canister, such that the oil filter canister will rotate for cutting when the at least one drive pin engages the at least one oil flow apertures. Using at least one drive pin assembly to rotate the oil filter canister advantageously prevents the oil filter canister from becoming overly tight on the interchangeable oil filter adapter due to rotation of the oil filter inspection device during operation. According to a preferred embodiment of the present invention the oil filter inspection device has a motor that can be powered with a portable energy source but a standard or non-standard energy source for example an electric outlet, can also be used to power the motor. Additionally fuel such as gasoline or propane can also be used to power the motor.

Figure 1:
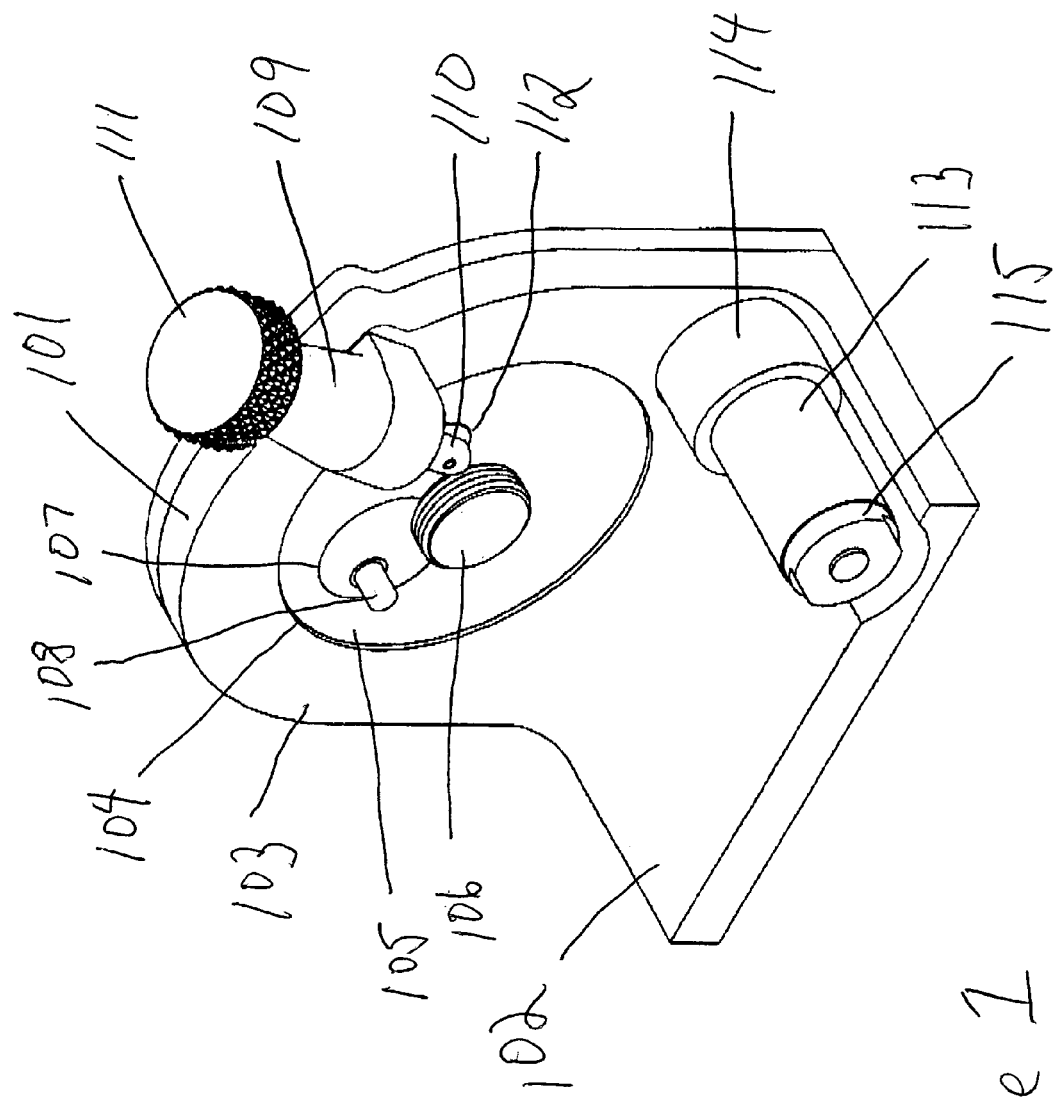
FIG. 1 is a front view of a lightweight portable oil filter inspection device having a rechargeable battery power pack according to an embodiment of the present invention.

Referring to FIG. 1 which illustrates a front view of an oil filter inspection device according to an embodiment of the present invention, the oil filter inspection device comprising a housing 101 formed as a standing base 102 and a sidewall 103. The sidewall 103 is perpendicular to the standing base 102 but can be constructed to be at other angles relative to the standing base 102. The housing 101 can be constructed from lightweight materials such as metallic alloys and plastics, as well as heavier materials such as steel and iron. In a preferred embodiment according to the present invention the housing 101 is constructed to be free standing and portable however the housing can also be constructed to be wall mounted, or both portable and wall mounted if desired. The sidewall 103 comprises a drive plate mounting 104. A drive plate 105 is positioned into the drive plate mounting 104 such that the drive plate 105 is capable of movement within the drive plate mounting 104. To facilitate movement of the drive plate 105 within the drive plate mounting 104, the drive plate mounting 104 can be constructed to include a plurality of ball bearings (Described below in FIG. 5) such that a portion of the drive plate 105 will be positioned to contact the plurality of ball bearings. At least one of a plurality of interchangeable oil filter adapters 106 is connected to the drive plate 105. The at least one of a plurality of interchangeable oil filter adapters 106 are constructed to accommodate at least one of a plurality of oil filter canisters having a size center apertures that conforms to the at least one of a plurality of interchangeable oil filter adapters 106. The drive plate 105 further comprises a drive pin receiving mounting 107 capable of receiving an adjustable drive pin assembly 108, and a cutting blade assembly mounting 109 capable of receiving a cutting blade assembly 110. Adjustment of the cutting blade assembly 110 is controlled by moving a cutting blade assembly knob 111 such as by turning, twisting or rotating the cutting blade assembly knob 111 relative to the housing 101. The cutting blade assembly knob advantageously allows precise adjustment of a cutting blade 112 such that the cutting blade 112 is in optimal cutting contact with any oil filter canister that is to be cut during operation of the inspection device. An electric motor 113 is positioned into a motor mounting 114. According to a preferred embodiment of the present invention, a portable energy source 115 is further connected to the electric motor 113 to supply power to the inspection device but other energy sources for example a standard, a non-standard electrical outlet and fuel can also be used, as an energy source.

Figure 2:
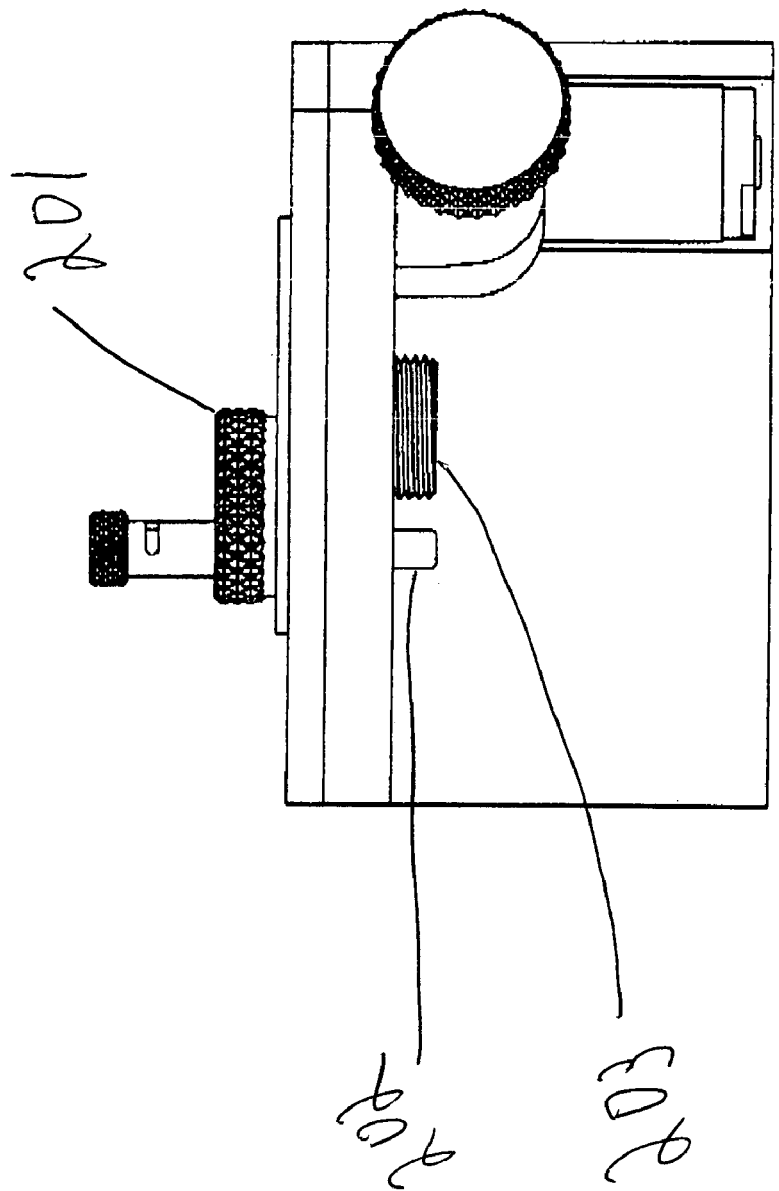
FIG. 2 is a top view of a lightweight portable oil filter inspection device having adjustable detent drive pins according to an embodiment of the present invention.

Referring to FIG. 2 which illustrates a top view of an oil filter inspection device according to an embodiment of the present invention, a drive pin locking knob 201 capable of movement is rotated relative to the oil filter inspection device such that an adjustable drive pin 202 can freely be positioned to engage or disengage at least one of a plurality of oil flow apertures of an oil filter canister. During operation of the oil filter inspection device, at least one of a plurality of interchangeable oil filter size adapters 203 is selected to accommodate an oil filter canister (Not Shown) to be inspected, and is connected to the drive plate. The drive pin locking knob 201 is adjusted such that the adjustable drive pin 202 is disengaged and positioned to allow the oil filter canister to be connected onto the at least one of a plurality of interchangeable oil filter size adapters that is connected to the drive plate thereby advantageously securing the oil filter canister onto the drive plate. Upon the adjustable drive pin 202 being optimally aligned and inserted into an oil flow aperture of the oil filter canister secured onto the drive plate, the drive pin locking knob 201 is turned to lock and prevent the drive pin 202 from further movement. The oil filter canister is thereby advantageously secured onto the drive plate by the at least one of a plurality of interchangeable oil filter size adapter 203 and rotationally driven for cutting by the drive pin 202 that is locked into position by the drive pin locking knob 201. Use of the drive pin 202 to rotate the oil filter canister advantageously prevents the oil filter canister from becoming overly tightened onto the at least one of a plurality of interchangeable oil filter size adapters 203 during operation of the oil inspection device.

Figure 3:
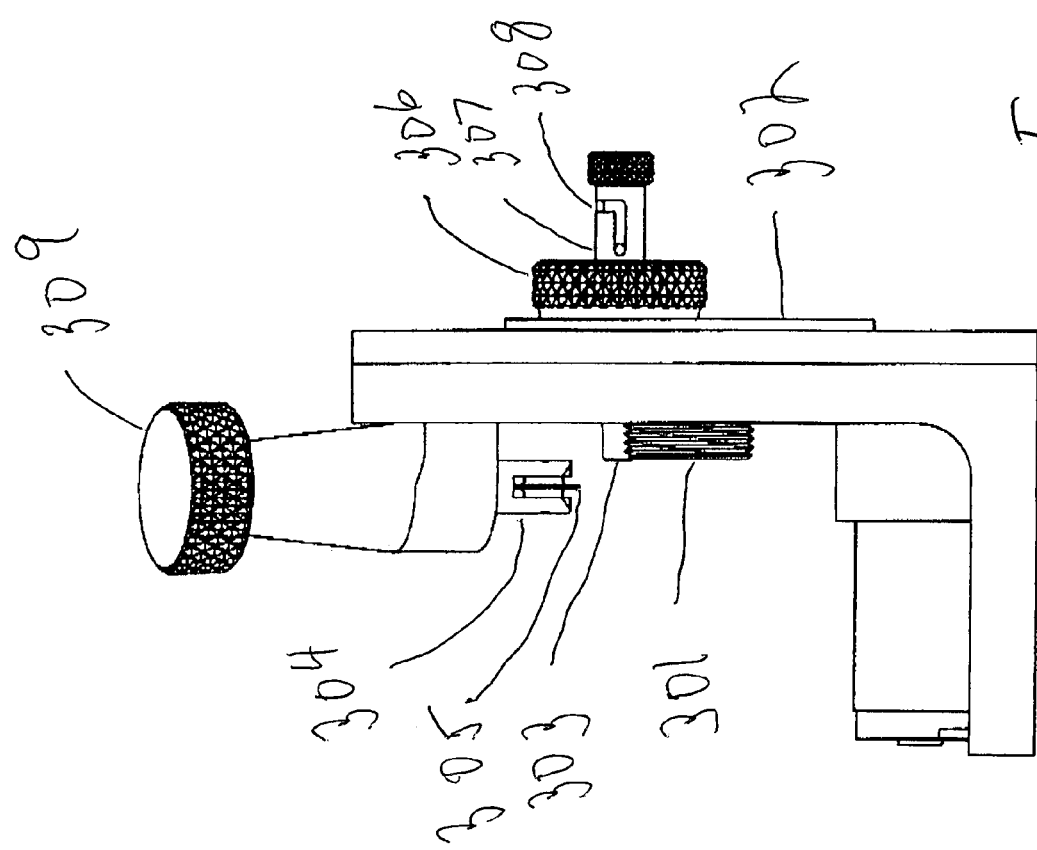
FIG. 3 is a side view of a lightweight portable oil filter inspection device having an oil filter adapter according to an embodiment of the present invention.

Referring to FIG. 3 which illustrates a side view of an oil filter inspection device according to a preferred embodiment of the present invention, comprising at least one of a plurality of interchangeable oil filter size adapters 301 used for connecting an oil filter canister (not shown) to a drive plate 302, at least one of a plurality of adjustable drive pins 303 for rotating the oil filter canister connected to the drive plate 302 by the at least one of a plurality of interchangeable oil filter size adapters 301, and an adjustable cutting blade assembly 304 for positioning a cutting blade 305 to contact the oil filter canister that is to be inspected. In a preferred embodiment according to the present invention, the cutting blade 305 is capable of movement within the adjustable cutting blade assembly but the cutting blade 305 can also be fixed. During operation of the oil filter inspection device, a drive pin locking knob 306 is rotated, turned or twisted to disengage at least one of a plurality of adjustable drive pins 303 whereby the at least one of a plurality of adjustable drive pins 303 is capable of movement. To connect an oil filter canister to the at least one of a plurality of interchangeable oil filter size adapters 301, a drive pin position mounting 307 comprising a drive pin track 308 is utilized to lock the disengaged at least one of a plurality of drive pins 303 in a position free of interference to the connection of the oil filter canister to the at least one of a plurality of interchangeable oil filter size adapters 301. Upon the oil filter canister being connected to the at least one of a plurality of interchangeable oil filter size adapters 301, the at least one of a plurality of drive pins 303 is aligned with an oil flow aperture of the oil filter canister. The at least one of a plurality of drive pins 303 is then unlocked and inserted into the oil flow aperture, by moving the at least one of a plurality of drive pins 303 along the drive pin track 308 of the guide pin mounting 307. The drive pin locking knob 306 is positioned to engage the at least one of a plurality of drive pins 303 preventing the at least one of a plurality of drive pins 303 from further movement. The cutting blade adjusting knob 309 is positioned such that the cutting blade assembly 304 causes the cutting blade 305 to engage an outer surface of the oil filter canister for cutting.

Figure 4:
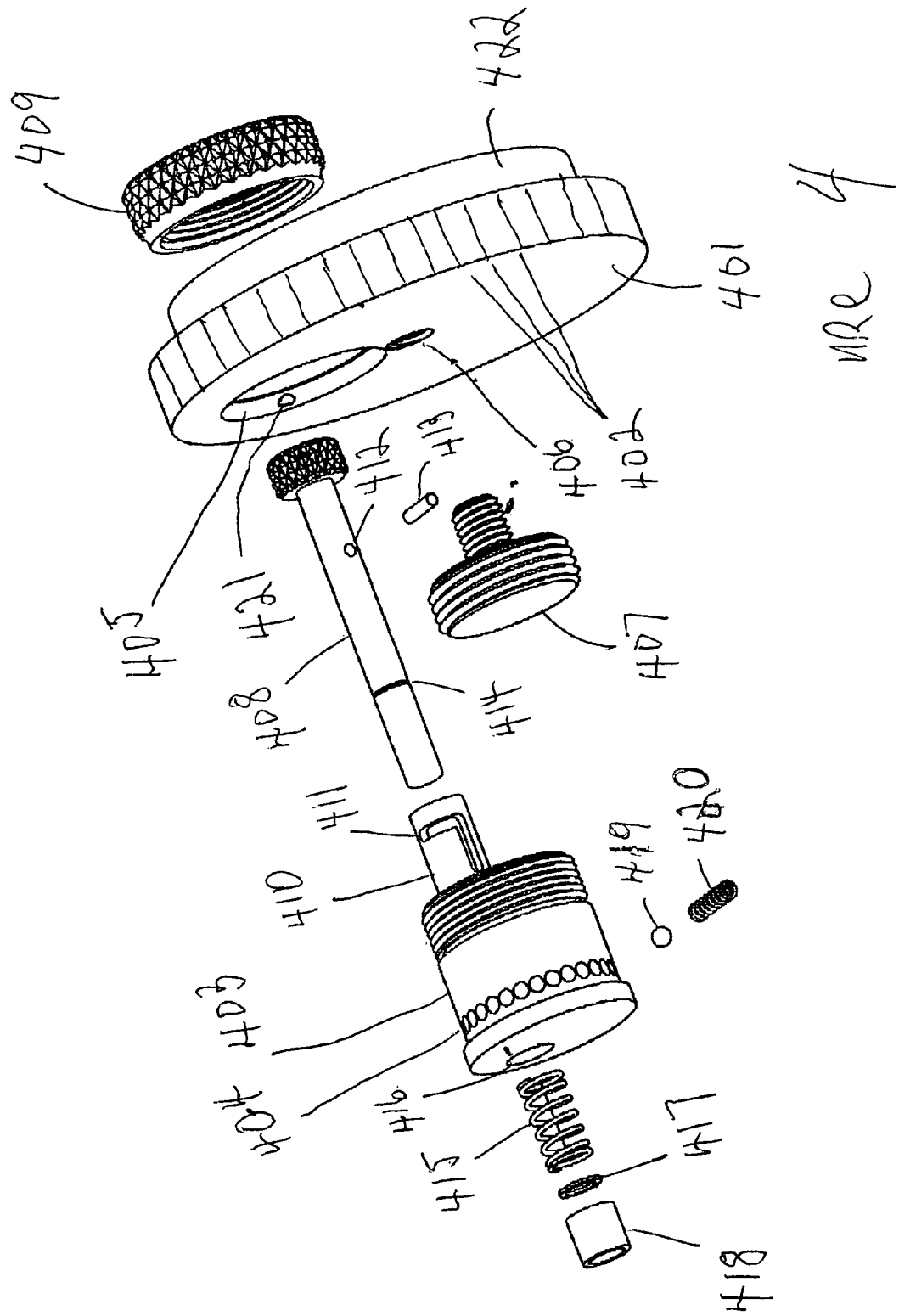
FIG. 4 is a side view of components of a drive pin assembly having detents and a drive plate according to an embodiment of the present invention.

Referring to FIG. 4 which illustrates a side view of drive plate 401 having a plurality of gear teeth 402 comprising a drive pin assembly 403 having a plurality of detents 404 for positioning into a drive pin assembly mounting 405 of the drive plate 401 and a filter size adapter mounting 406 for receiving at least one of a plurality of interchangeable filter size adapters 407 according to a preferred embodiment of the present invention. The drive pin assembly 403 having a plurality of detents 404 further comprises a drive pin 408, a drive pin assembly locking knob 409, and a drive pin position mounting 410 having a guide pin track 411. The drive pin 408 further comprises a drive pin guide mounting 412 that accepts a drive pin guide pin 413. Upon the drive pin 408 being inserted into the drive pin position mounting 410, the drive pin guide pin 413 is connected to the drive pin guide mounting 412 such that the drive pin guide pin 413 can move within the drive pin track 411. The drive pin 408 further comprises a drive pin retaining track 414. Upon the drive pin 408 being fully inserted into the drive pin position mounting 410, a drive pin spring 415 is connected into the drive pin assembly spring mounting 416, the drive pin 408 is connected to the drive pin spring 415 using a spring retainer 417 that connects onto the drive pin retaining track 414. In a preferred embodiment according to the present invention the drive pin track 411 is constructed such that the drive pin guide pin 413 can be positioned within the drive pin tract 411 to lock the drive pin spring 415 in a compressed position, if desired. For steady movement of the drive pin 408, a drive pin bushing 418 capable of receiving the drive pin 408 is connected to the drive pin assembly spring mounting 416 preferably using a pressing device but other connection methods can be used. The plurality of detents 404 of the drive pin assembly 403 align with at least one detent ball 419. In a preferred embodiment according to the present invention, the at least one detent ball 419 is spring tensioned using at least one detent spring 420 connected to a detent ball mounting 421. When the drive pin assembly 403 is positioned into the drive pin assembly mounting 405, the spring tensioned at least one detent ball 419 engages at least one of the plurality of detents 404 of the drive pin assembly 403 thus advantageously permitting precision sequential rotational movement of the drive pin assembly 403 within the drive plate 401. Precision rotation of the drive pin assembly 403 allows for a more precise alignment of the drive pin 408 with at least one of a plurality of oil filter flow apertures of an oil filter canister. During operation of the oil filter inspection device, the drive pin locking knob 409 allows or prevents motion of the drive pin position assembly 403 depending on whether the drive pin locking knob 409 is positioned to engage or disengage the drive pin assembly 403. When the drive pin locking knob 409 is rotated to disengage the drive pin assembly 403, the drive pin 408 can be moved in a direction opposite to the drive pin spring 415 whereby the drive pin spring 415 is compressed. When the drive pin spring 415 is compressed, the drive pin 408 can then be moved in accordance with the curvature of the drive pin guide track 411 thereby locking the drive pin 408 into a disengaged position. An oil filter canister (not shown) can then be threaded onto the at least one interchangeable oil filter adapters 407 previously connected to the oil filter adapter mounting 406. The drive pin assembly 403 can then be positioned using sequential engagement of the at least one spring 419 tensioned ball bearing 420 to at least one of the plurality of detents 404 of the drive pin assembly 403 such that the drive pin 408 is aligned with at least one of an oil flow aperture of an oil filter canister. Once the drive pin 408 is aligned with the at least one of an oil flow aperture, the drive pin 408 can be unlocked whereby the drive pin 408 will engage the at least one oil flow aperture that the drive pin 408 is aligned with. The drive pin locking knob 409 can then be rotated into an engaged position such that the drive pin assembly 403 can no longer rotate within the drive pin assembly mounting 405. According to a preferred embodiment of the present invention the drive plate 401 further comprises a ball bearing interface 422. The ball bearing interface 422 is constructed such that the ball bearing interface 422 will contact a plurality of ball bearings (Described below in FIG. 5) that are connected to a drive plate mounting of a housing advantageously resulting in smooth rotation of the drive plate 401 within the drive plate mounting of the housing. In yet another embodiment according to the present invention, the plurality of gear teeth 402 of the drive plate 401 are compatible with a motor drive gear having a plurality of drive teeth (Described below in FIG. 5) that is connected to a drive motor. During operation, the rotation of the compatible motor drive gear having a plurality of drive teeth which is engaged with the drive plate 401 having a plurality of gear teeth 402 causes the drive plate 401 to move resulting in the engaged drive pin 408 moving with the drive plate 401. That movement results in a smooth steady rotation of the oil canister against an optimally adjusted engaged cutting blade (Described above in FIG. 3) advantageously producing a clean steady cut of the oil canister.

Figure 5:
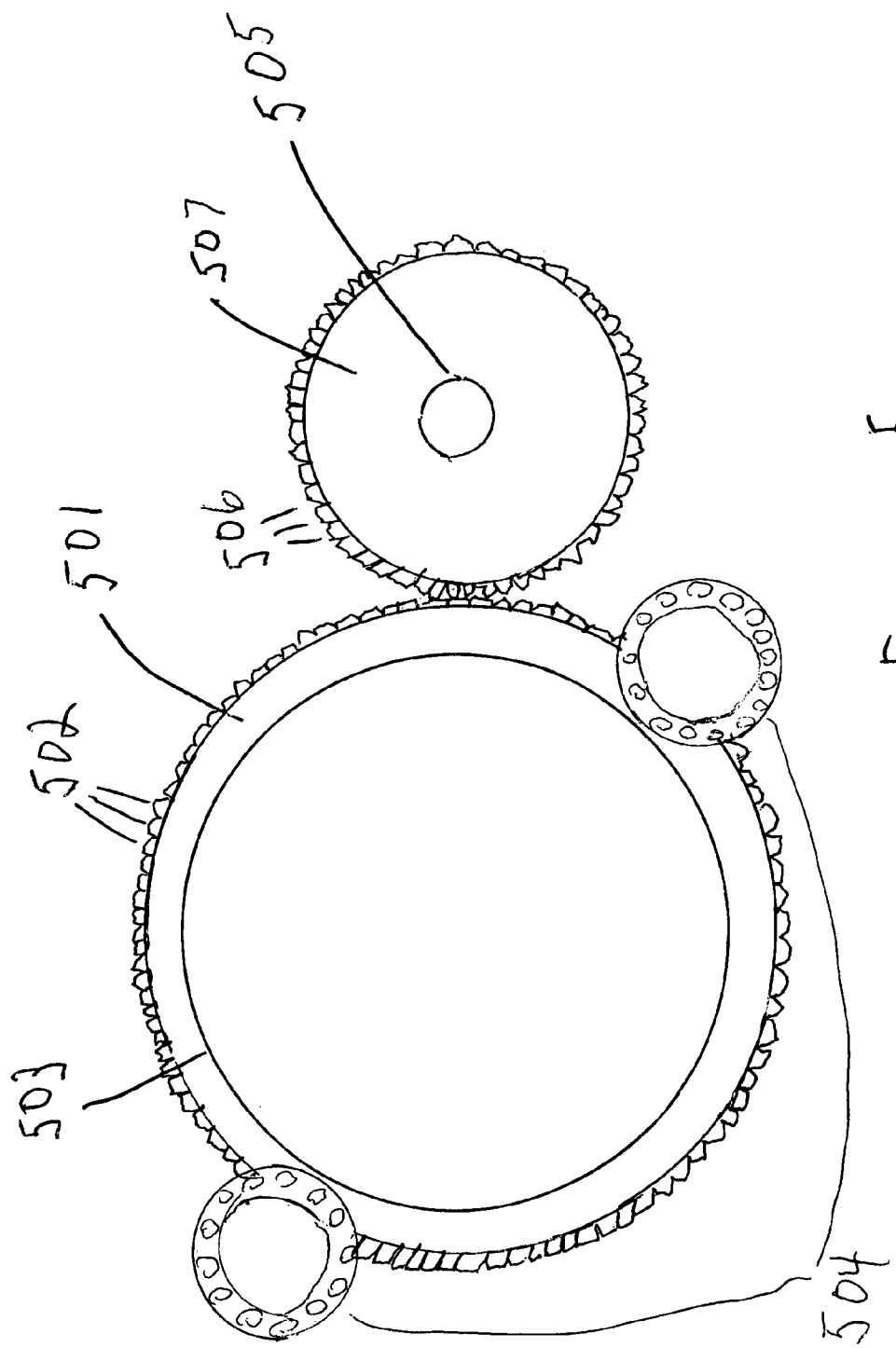
FIG. 5 is a view of drive plate having gear teeth and a motor drive gear according to an embodiment of the present invention.

Referring to FIG. 5, which illustrates a drive plate having a plurality of gear teeth and a motor drive gear having a plurality of drive teeth, according to an embodiment of the present invention. According to a preferred embodiment of the present invention a drive plate 501 having a plurality of gear teeth 502 on its outside circumference further comprises a ball bearing interface 503. The ball bearing interface 503 allows the drive plate 501 to mechanically interact with a plurality of ball bearings 504 that are connected to a drive plate mounting of a housing (Described above in FIG. 1) such that the drive plate 501 is capable of smooth rotational movement within the housing. In another embodiment according to the present invention the drive plate 501 can be mounted onto a shaft capable of allowing movement of the drive plate 501. In yet another embodiment according to the present invention the drive plate 501 can be mounted within a bushing or similar device that allows movement of the drive plate 501 within the housing. In a preferred embodiment according to the present invention the motor drive gear 505 having a plurality of drive teeth 506 compatible with the plurality of gear teeth 502 of the drive plate 501 is mounted onto a shaft 507 of a motor such that when the motor is powered on, the shaft 507 of the motor rotates whereby the motor drive gear 505 mounted onto the shaft 507 of the motor also rotates, resulting in the drive plate 501 to advantageously smoothly rotate upon the plurality of ball bearings 504 in a steady uninterrupted manner ultimately producing a smooth steady cutting effect upon an oil canister.

Having described embodiments for an oil filter inspection device apparatus and a method for using same, it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. An oil filter inspection device comprising:
   An inspection device housing including a sidewall for positioning an oil filter to be cut,
   A drive plate having an oil filter size adapter mounting and at least one drive pin assembly mounting having at least one detent engaging means, whereby the drive plate is movably connected to the sidewall of the inspection device housing,
   At least one oil filter size adapter having a means for connecting the oil filter size adapter mounting,
   At least one drive pin assembly having a plurality of detents for engaging the at least one detent engaging means wherein the at least one drive pin assembly includes at least one drive pin, at least one drive pin locking knob, at least one drive pin mounting having a drive pin guide track, wherein the at least one drive pin further includes a drive pin guide mounting and a drive pin guide pin capable of connecting to the drive pin guide mounting whereby the drive pin guide pin is capable of being positioned into the drive pin guide track of the at least one drive pin mounting,
   At least one cutting blade assembly, and
   A means for rotating the drive plate.

2. The oil filter inspection device of claim 1, wherein the sidewall of the inspection device housing further comprises a plurality of ball bearings connected to the sidewall of the inspection device housing, and the drive plate further comprises a ball bearing interface capable of being connected to the plurality of ball bearings, such that when connected to the sidewall of the inspection device housing the ball bearing interface engages the plurality of ball bearings.

3. The oil filter inspection device of claim 1, wherein the at least one drive pin assembly further includes at least one drive pin having a drive pin retaining track, a drive pin assembly spring mounting, a drive pin spring capable of being connected to the drive pin assembly spring mounting, a spring retainer capable of being connected to the drive pin retaining track, and a drive pin bushing capable of being connected to the drive pin assembly spring mounting.

4. The oil filter inspection device of claim 1, wherein the at least one cutting blade assembly includes a cutting blade locking knob, a cutting blade positioning assembly and a cutting blade.

5. The oil filter inspection device of claim 4, wherein the cutting blade includes at least one of a non-stationary cutting blade and a stationary blade.

6. The oil filter inspection device of claim 1, wherein the drive plate includes a drive plate having a plurality of gear teeth.

7. The oil filter inspection device of claim 6, wherein the means for rotating the drive plate includes a motor and a motor drive gear having a plurality of drive teeth capable of moving the drive plate having a plurality of gear teeth.

8. The oil filter inspection device of claim 7, wherein the motor is at least one of an electric motor and fuel powered motor.

9. The oil filter inspection device of claim 8, further comprising a portable energy source to power the motor.

10. The oil filter inspection device of claim 9, wherein the portable energy source is at least one of a non-rechargeable battery, a rechargeable battery.

11. The oil filter inspection device of claim 1, wherein the at least one oil filter size adapter includes at least one oil filter size adapter having oil filter screw threads.

12. The oil filter inspection device of claim 1, wherein the means for connecting the at least one oil filter size adapter to the oil filter size adapter mounting includes a screw threading means.

13. The oil filter inspection device of claim 1, wherein the at least one detent engaging means includes at least one detent ball.

14. The oil filter inspection device of claim 13, wherein the at least one detent engaging means further comprises at least one detent ball spring, whereby the at least one detent ball is spring tensioned when engaging at least one of the plurality of detents of the drive pin assembly.

15. The oil filter inspection device of claim 1, wherein the inspection device housing is at least one of portable, lightweight and wall mountable.

16. The oil filter inspection device of claim 15, wherein the inspection device housing is constructed from at least one of aluminum, metallic alloy, plastic, steel and cast iron.

17. The oil filter inspection device of claim 1, wherein the at least one oil filter size adapter includes at least one oil filter size adapter capable of fitting at least one of an automotive oil filter, a farm machine oil filter, an aircraft oil filter, an internal combustion engine oil filter and a hydraulics oil filter.

* * * * *